United States Patent
Takeda et al.

(10) Patent No.: US 6,760,326 B1
(45) Date of Patent: Jul. 6, 2004

(54) LAN COMMUNICATING APPARATUS AND INTERFACE BETWEEN THE SAME AND LAN TERMINAL

(75) Inventors: Yutaka Takeda, Fukuoka (JP); Kenichi Shingae, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/561,302

(22) Filed: Apr. 28, 2000

(30) Foreign Application Priority Data

May 7, 1999 (JP) .......................................... 11-126628
May 11, 1999 (JP) .......................................... 11-129609

(51) Int. Cl.[7] ............................................. H04L 12/28
(52) U.S. Cl. ....................................... 370/352; 370/352
(58) Field of Search ................................ 370/352, 353, 370/354, 355, 356, 286, 287, 288, 289, 468, 447

(56) References Cited

U.S. PATENT DOCUMENTS 5,682,386 A 10/1997 Arimilli et al. ............. 370/468
5,841,778 A 11/1998 Shaffer et al. .............. 370/447
6,463,051 B1 * 10/2002 Ford .......................... 370/352
6,600,734 B1 * 7/2003 Gernert et al. .............. 370/352

FOREIGN PATENT DOCUMENTS

JP        09-135241        5/1997

\* cited by examiner

*Primary Examiner*—Dang Ton
*Assistant Examiner*—Robert W. Wilson
(74) *Attorney, Agent, or Firm*—RatnerPrestia

(57) ABSTRACT

In a LAN communication apparatus hooking up a telephone and a LAN terminal, a downstream LAN interface for hooking up a LAN terminal is provided in addition to a telephone interface for hooking up the telephone. Further, a voice-packet from the telephone is transmitted advantageously over a data-packet supplied from the LAN terminal to an upstream LAN. This structure allows the voice data to be transmitted to the upstream LAN advantageously over other data although the LAN terminal hooked up to the downstream LAN sends out volume of data. As a result, the voice data can be transmitted to the upstream LAN without delay.

2 Claims, 11 Drawing Sheets

FIG. 5

Hybrid interface Pin assignment (for two-wire analog telephone)

| Pin No. | 1 | 2 | 3 | 4 | 5 | 6 | 7 | 8 |
|---|---|---|---|---|---|---|---|---|
| 10BASE-T | TD+ | TD- | RD+ | | | RD- | | |
| 2W-Telephone | | | | L1 | L2 | | | |
| Hybrid Interface | TD+ | TD- | RD+ | L1 | L2 | RD- | | |

FIG. 9

Hybrid interface Pin assignment (for 2-wire analog telephone and 4-wire digital telephone)

| Pin No. | 1 | 2 | 3 | 4 | 5 | 6 | 7 | 8 |
|---|---|---|---|---|---|---|---|---|
| 10BASE-T | TD+ | TD- | RD+ | | | RD- | | |
| 4W-Telephone | | | L3 | L1 | L2 | L4 | | |
| Hybrid Interface | TD+ | TD- | RD+ | L1 | L2 | RD- | L3 | L4 |

LAN COMMUNICATING APPARATUS AND INTERFACE BETWEEN THE SAME AND LAN TERMINAL

FIELD OF THE INVENTION

The present invention relates to an apparatus for transmitting multimedia data including audio data in real time on the internet protocol (IP) network typically represented by Ethernet.

BACKGROUND OF THE INVENTION

Recently, a LAN communicating apparatus—including at least one telephone and allowing voice communication through local area network (LAN) or the internet—has been permeated in the market.

FIG. 11 is a block diagram illustrating a structure of a conventional LAN communicating apparatus. A LAN telephone communicating apparatus 1110 comprises the following elements:

(a) a telephone interface 1104 for hooking up a telephone 1108;

(b) a voice-processor 1102 for providing a voice stream from the telephone-interface 1104 with processes such as echo-cancellation, coding and exchanging;

(c) a voice IP processor 1101 for IP packetizing the voice stream supplied from the voice-processor 1102; and (d) an upstream LAN interface 1106 for coupling LAN communicating apparatus 1110 to an upstream LAN 1107 (e.g. a private branch exchange (PBX) LAN).

For instance, a user in an office has a LAN terminal 1109 (e.g. a personal computer including a 10 BASE-T terminal) and a telephone 1108. When the user hooks up both these apparatuses to the upstream LAN 1107, the telephone 1108 is hooked up to the LAN communicating apparatus 1110, and the LAN terminal 1109 is either hooked up directly to the LAN 1107 or hooked up to a LAN coupling device 1103 such as a repeater hub or a switching hub.

In the LAN communicating apparatus 1110 structured above, a larger traffic in the upstream LAN 1107 delays voice data substantially, and this interferes with the communication, because the LAN 1107 cannot control which traffic goes first, the data traffic or the voice traffic.

In other words, the conventional structure hooks up the LAN terminal and the LAN communicating apparatus to the upstream LAN on equal terms with each other. Therefore, a priority control over the LAN terminal and the LAN telephone communicating apparatus, i.e. which traffic goes first, fully depends on a router, or a switching hub such as a media-access-control (MAC) frame switcher. In particular, when an entrance of the upstream LAN is coupled to a shared-type network such as a repeater hub, the priority control over those two, i.e. which traffic goes first, is impossible.

When a user wants to hook up both the LAN terminal and the telephone to the upstream LAN, each connection requires respective connectors and wires in conventional manner. This increases the cost and makes the operation, as well as maintenance complicated.

SUMMARY OF THE INVENTION

The present invention aims to solves the problems discussed above in coupling both a LAN terminal and a telephone to a LAN.

A LAN communicating apparatus of the present invention—hooking up a telephone and a LAN terminal—for communicating between the LAN and the telephone or the LAN terminal, comprises the following elements:

(a) a telephone interface for hooking the telephone;

(b) a downstream LAN interface for hooking up the LAN terminal on a down stream side; and (c) a bridge processor for providing voice data from the telephone interface and data sent through the downstream LAN interface with a bridge process.

This structure allows the voice data to be sent to the upstream LAN advantageously over data-packet supplied from the LAN terminal. Therefore, if the LAN terminal belonging to the downstream LAN sends volume of data, voice data from the telephone can be transmitted without delay.

Further, a traffic controller is added to the structure discussed above so that the controller can monitor flow-in volume and a sender's address of MAC frames supplied from the upstream LAN. When determining that the flow-in volume substantially affects the voice traffic from the telephone, the controller instructs the sender to regulate the volume of MAC frames to be sent out. As a result, delay of voice data due to data congestion between the LAN communicating apparatuses on the LAN can be avoided.

Another LAN communicating apparatus of the present invention comprises the following elements:

a LAN interface;

a telephone interface; and a hybrid interface.

The hybrid interface is formed of an N-conductor connector, and the pins used for the LAN terminal out of N-pins are connected to the LAN interface, and the other pins not used for the LAN terminal are connected to the telephone interface. This N-conductor connector thus hooks up both of the LAN terminal and the telephone.

As a result, the wiring cost to the LAN terminals can be reduced and such unified connector allows the operation and maintenance of the system to be substantially easy.

The present invention also provides a distribution connector which can couple both the LAN terminal and the telephone to the LAN—operating based on the same principal as discussed above.

BRIEF DESCRIPTION OF THE DRAWINGS

FIG. 5 illustrates pin-assignment of the hybrid interface on the LAN communicating apparatus side, the LAN terminal side, and the telephone side.

FIG. 9 is a pin-assignment of the hybrid interface on the side of LAN communicating apparatus side, a LAN terminal side, and a telephone side in accordance with the fifth embodiment.

DESCRIPTION OF THE PREFERRED EMBODIMENTS

Exemplary Embodiment 1

Figure 1:
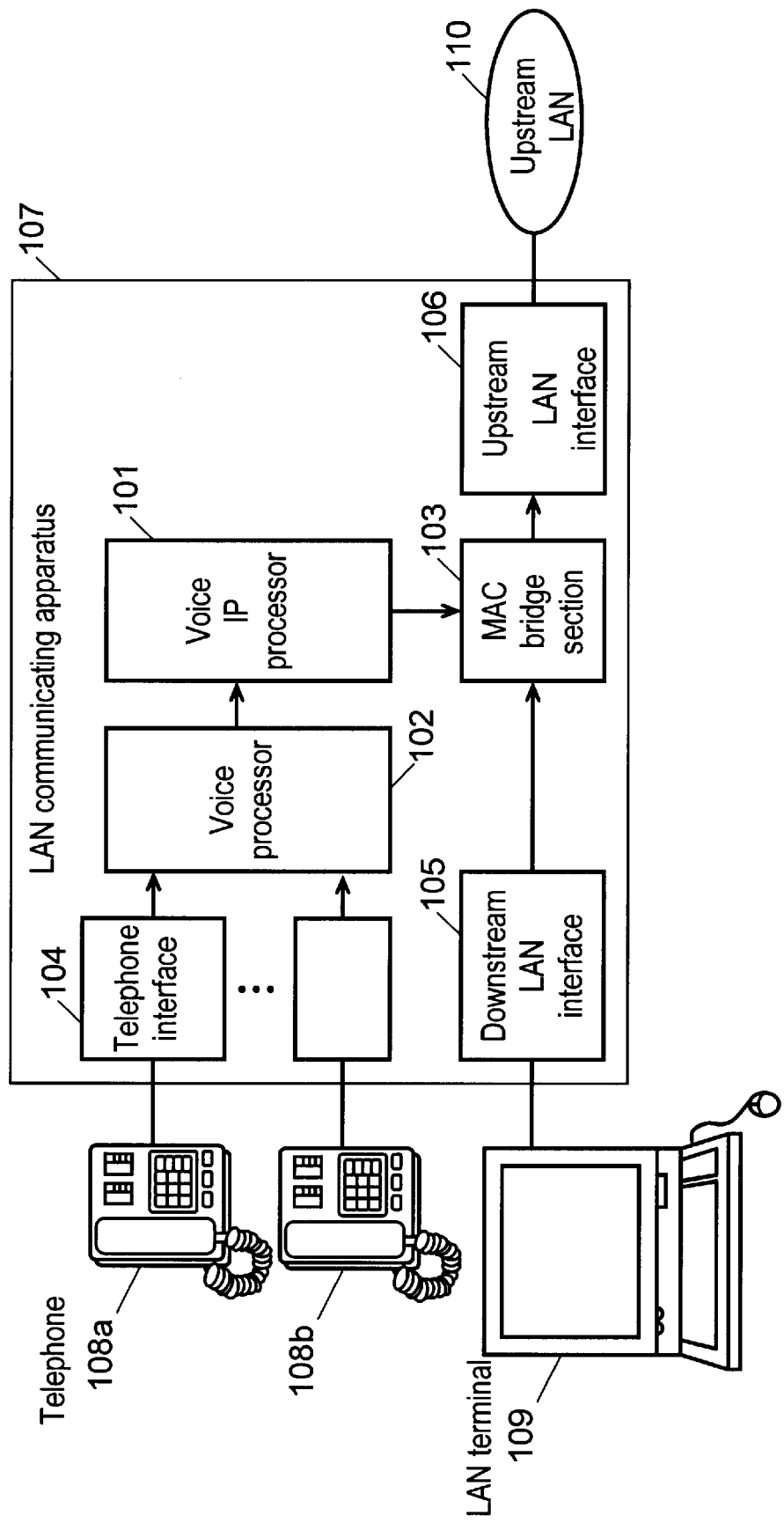
FIG. 1 is a block diagram of a LAN communicating apparatus having a priority control function in accordance with a first exemplary embodiment of the present invention.

FIG. 1 is a block diagram of a LAN communicating apparatus 107 having a priority control function in accordance with a first exemplary embodiment.

A voice data in analog form supplied from a telephone 108a is converted to one in digital form by a telephone interface 104, then transferred to a voice processor 102. The voice data in digital form undergoes echo-canceling process or coding process in the voice processor 102, then IP packetized by a voice IP processor 101. The voice data in the IP packet then undergoes a TCP/UD layer process as well as an IP layer process. Finally, the IP packet containing the voice data is transmitted to a MAC bridge section 103 as a voice-MAC frame.

On the other hand, a MAC frame sent from LAN terminal 109 is transferred to the MAC bridge section 103 via a downstream LAN interface 105.

The MAC bridge section 103 receives the voice-MAC frame supplied from the voice IP processor 101 and a data-MAC frame supplied from the downstream LAN interface 105, then provides those data with a MAC layer process. At this time, the voice-MAC frame is advantageously processed before the data-MAC frame, and sent out. In other words, when voice-MAC frame contends with the data-MAC frame is processed in the MAC bridge section 103, the section 103 holds the process of the data-MAC frame supplied from the downstream LAN interface 105. Then, the section 103 provides the voice-MAC frame supplied from voice IP processor 101 with the MAC layer process advantageously over the data-MAC frame. Finally, the bridge section 103 transfers the processed voice-MAC frame to the upstream LAN interface 106. As a result, this structure allows the MAC bridge section 103 to send the voice signal—avoiding influence of traffic from the LAN terminals—to the upstream LAN without delay.

Exemplary Embodiment 2

Figure 2:
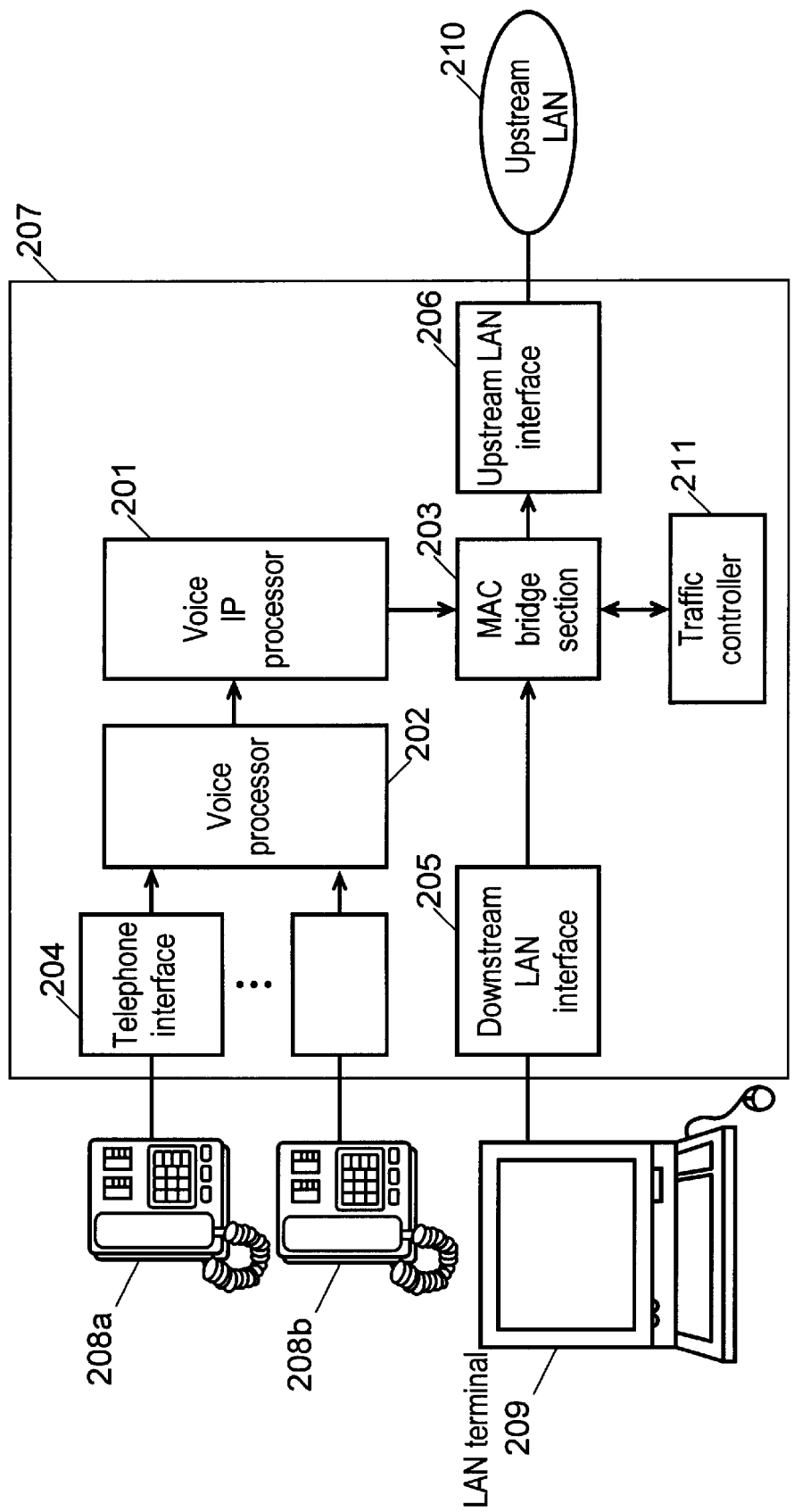
FIG. 2 is a block diagram of a LAN communicating apparatus having a priority control function in accordance with a second exemplary embodiment of the present invention.

FIG. 2 is a block diagram of a LAN communicating apparatus 207 having a priority control function in accordance with a second exemplary embodiment. In the second embodiment, a traffic controller 211 is added to the structure used in the first embodiment. The traffic controller 211 monitors traffic volume in an upstream LAN 210 and instructs the sender of frames to regulate frequency of sending frames.

In the LAN communicating apparatus 207 having a priority control function, the traffic controller 211 constantly monitors the traffic volume in the upstream LAN 210. A criterion of the traffic volume may be a volume received by a MAC bridge section 203 within a unit period. The criterion may also be a transmission delay time of a voice MAC frame, i.e. a period between when the MAC bridge 203 starts transmitting a voice-MAC frame to the upstream LAN 210 and when finishes the transmission after obtaining a right of transmission advantageously over other data. The reason why this transmission delay time is extended is that the transmission is held because of increased traffic volume in the upstream LAN 210.

The traffic controller 211 monitors the traffic volume in the upstream LAN 210 in this way, i.e. the controller 211 monitors the following two types of data out of the MAC frames received by the MAC bridge-section 203, namely, source addresses of data-MAC frames supplied from another LAN communicating apparatus having a priority control function and a traffic volume from each source address. This monitoring method allows the monitored source addresses to specify this another LAN communicating apparatus having the priority control function. Thus if the voice traffic now communicating is affected by data traffic to be received, the controller 211 can instruct the sender, i.e. another LAN communicating apparatus having the priority control function, to regulate frequency of sending data-MAC frames.

The LAN communicating apparatus instructed regulates the frequency of sending the data-MAC frames to the upstream LAN 210. The way of regulating the frequency is to extend intervals between data-MAC frames to be sent out.

As a result, the present invention avoids delay of a voice data due to data-congestion between apparatuses on the network.

Exemplary Embodiment 3

Figure 3:
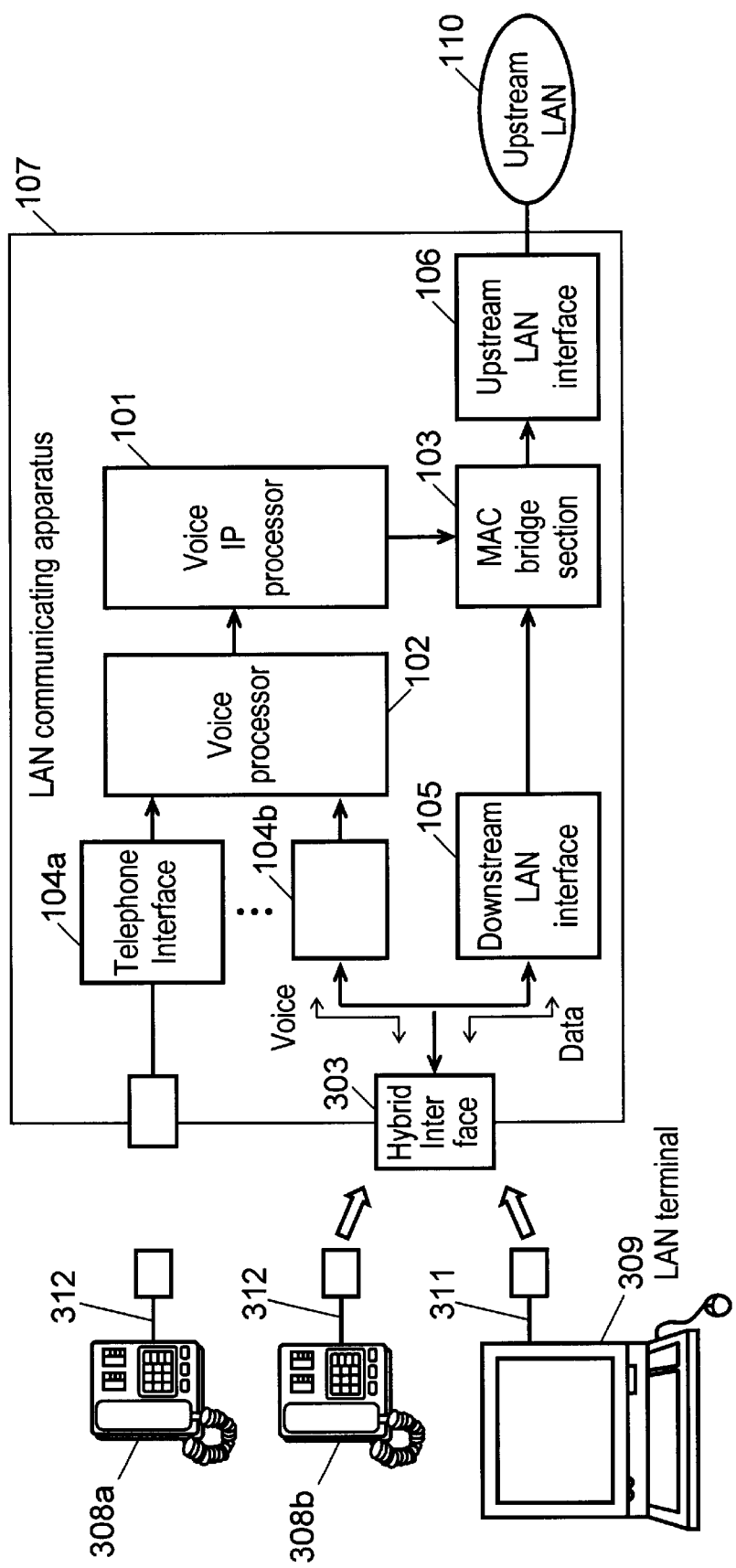
FIG. 3 illustrates connections between a LAN terminal and a LAN communicating apparatus hooking up a telephone in accordance with a third embodiment.

FIG. 3 illustrates a structure where a hybrid interface is provided to the LAN communicating apparatus having the same structure as that used in the first embodiment. This hybrid interface allows one connector to hook up both a 10 BASE-T terminal and a telephone. A LAN communicating apparatus 101 comprises a downstream LAN interface 105, telephone interfaces 104a, 104b for transmitting or receiving voice data to/from telephones 308a, 308b, and a hybrid interface 303 permitting to hook up both a 10 BASE-T terminal 309 and the telephone 308b. The LAN interface 105 can transmit/receive data to/from the terminal 309. The hybrid interface 303 is a device to hook up the 10 BASE-T terminal and the telephone at the same time, to be more specific, it is an eight-conductor connector of RJ-45 type.

In this structure, when the 10 BASE-T terminal 309 is coupled to the hybrid interface 303 via a 10 BASE-T cable 311, the LAN interface 105 and the terminal 309 are physically coupled. When the telephone 308b is coupled to the hybrid interface 303 via a telephone cable 312, the telephone 308b and the telephone interface 104b are physically coupled.

Figure 4:
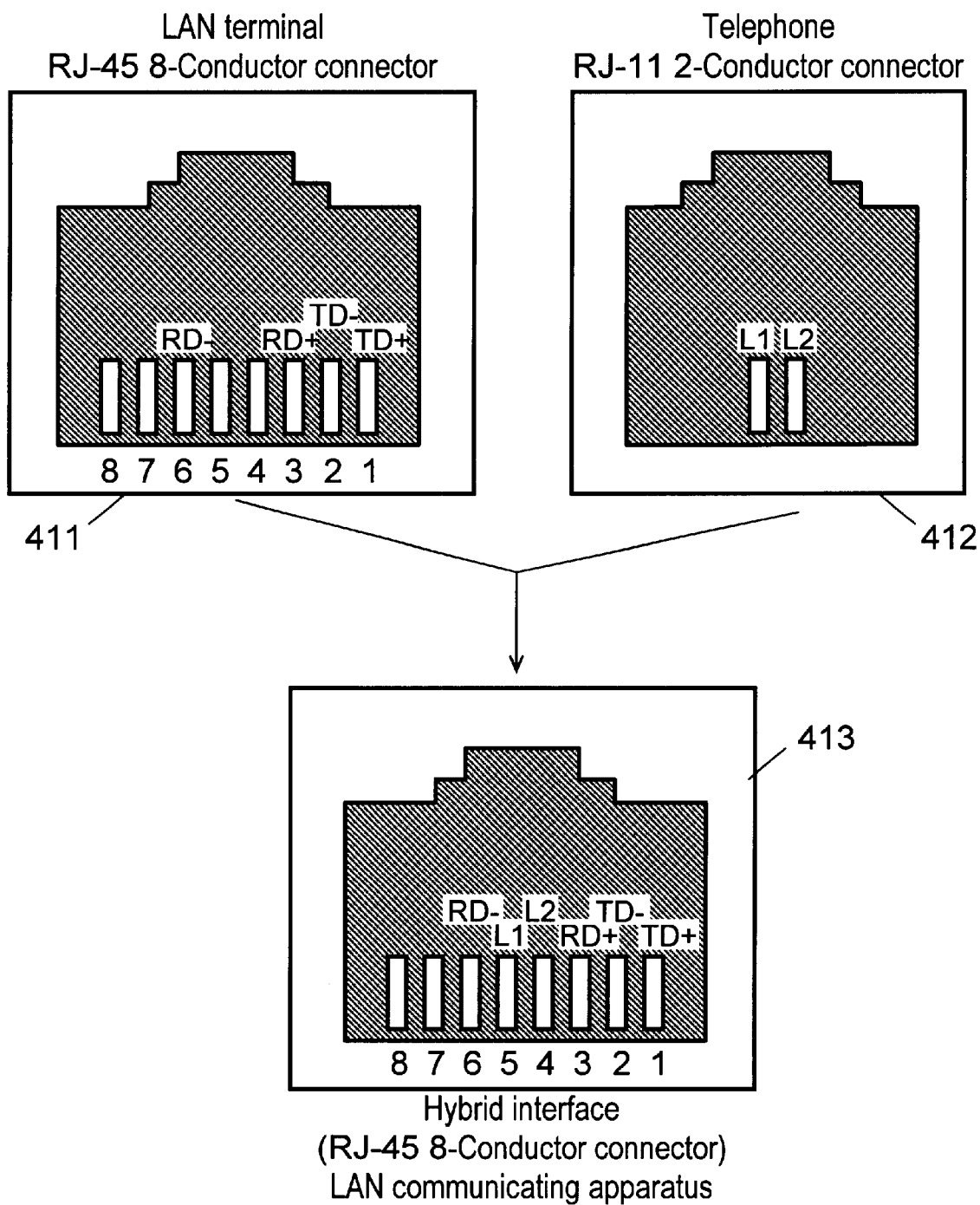
FIG. 4 illustrates pin-assignments of a hybrid interface connector on the LAN communicating apparatus side, a LAN terminal connector, and a telephone connector.

FIG. 4 illustrates pin-assignments of connectors concerning the coupling between the telephone, the LAN-terminal and the LAN communicating apparatus. Pin-assignment 411 illustrates the pin-assignment of a RJ-45 type 8-conductor connector for hooking up the 10 BASE-T terminal 309. Pin assignment 412 illustrates pin-assignment for hooking up a two-wire analog telephone. Pin assignment 413 illustrates pin assignment of the connector on the hybrid interface 303 for hooking up the LAN communicating apparatus.

In pin-assignment 411, pins Nos. 4 and 5, which have been not used, are assigned to the two-wire analog telephone, so that pin-assignment 411 can hook up either the 10 BASE-T cable 311 or the telephone cable 312. In the LAN communicating apparatus 101, pins Nos. 1, 2, 3 and 6 of pin assignment 413 of a connector on the hybrid interface 303 are connected to the LAN interface 105, pins Nos. 4 and 5 are connected to the telephone interface 104b. As such, the 10 BASE-T cable 311 and the telephone cable 312 have independent pin-assignments, so that the terminal 309 can be physically hooked up to the LAN interface 105, the and telephone 308b can be hooked up to the telephone interface 104b. FIG. 5 shows pin-assignment of the hybrid interface for hooking up the two-wire analog telephone.

Exemplary Embodiment 4

Figure 6:
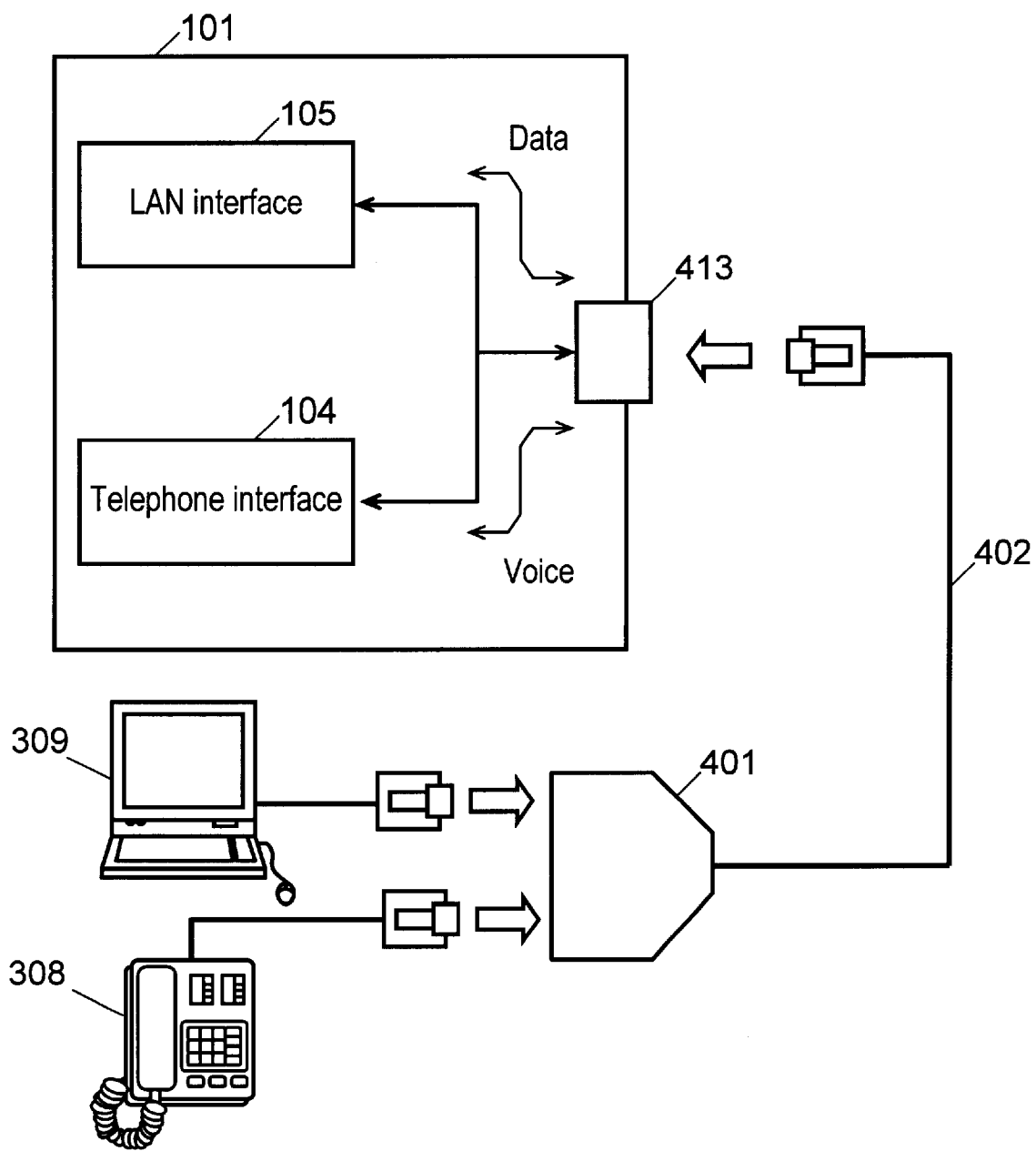
FIG. 6 is a block diagram illustrating a connection between a 10 BASE-T terminal and a telephone using a distribution connector to a LAN communicating apparatus in accordance with a fourth exemplary embodiment.

FIG. 6 illustrates how a distribution connector 401 hooks up the 10 BASE-T terminal 309, the telephone 308 and the LAN communicating apparatus 101. A cable 402 for coupling the connector 401 with the hybrid interface 413 is a 10 BASE-T cable.

Figure 7:
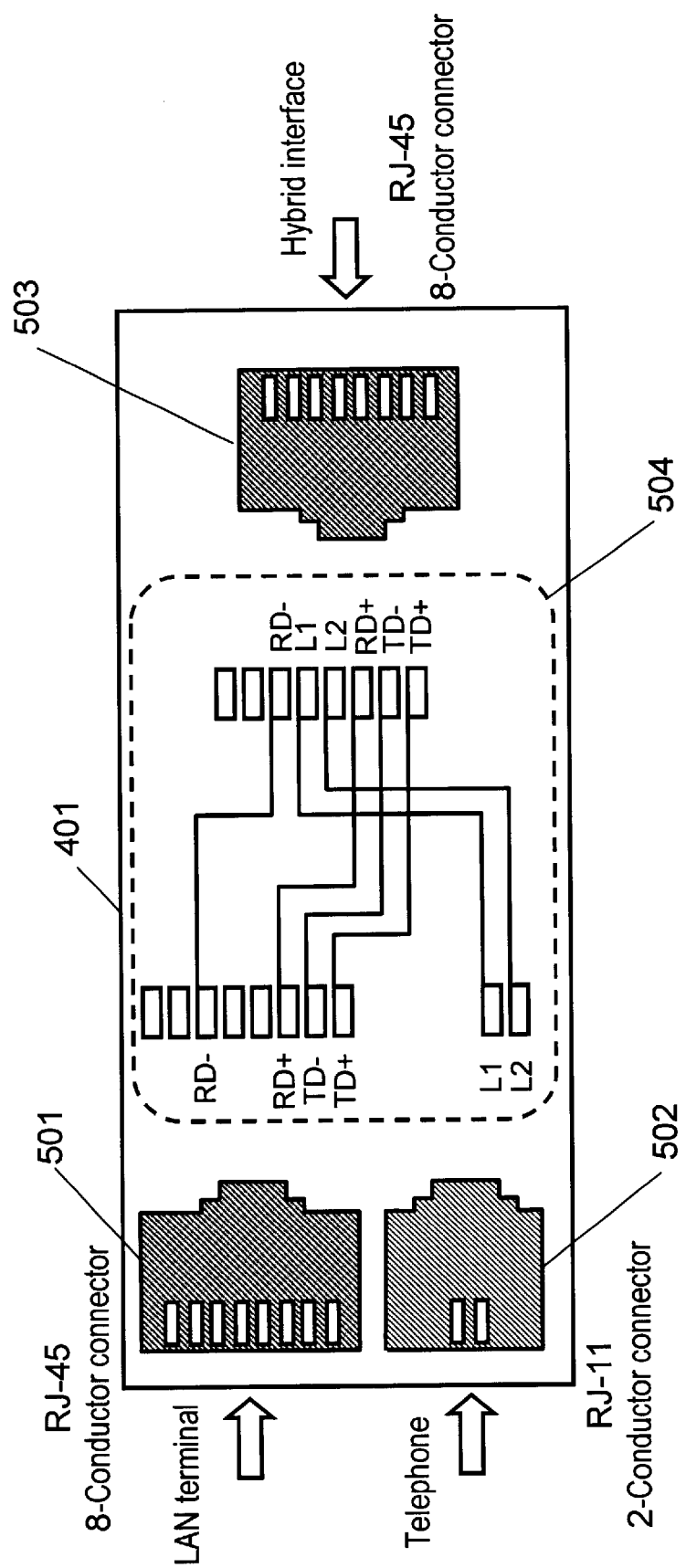
FIG. 7 illustrates a wiring of a distribution connector in accordance with the fourth embodiment.

FIG. 7 details the distribution connector 401, which houses three connectors in total, i.e. one RJ-11 type 2-conudctor connector 502, two RJ-45 type 8-conductor connectors 501, 503.

The 10 BASE-T terminal 309 is connected to the RJ-45 type eight-conductor connector 501, and the telephone 308 is connected to the RJ-11 type two-conductor connector 502. The hybrid interface 413 of the LAN communicating apparatus 101 is connected to the RJ-45 type eight-conductor connector 503.

Wiring between those three connectors 501, 502 and 503 is shown in a space encircled with a broken line 504. Pins of the hybrid interface 413 are distributed to the 10 BASE-T terminal (TD+, TD−, RD+, RD−) and the telephone (L1, L2).

This distribution connector 401 allows the 10 BASE-T terminal 309 to couple with the LAN interface 105 and allows the telephone 308 to couple with the telephone interface 104 respectively. Further, the terminal 309 and the telephone 308 can be operated simultaneously.

Exemplary Embodiment 5

Figure 8:
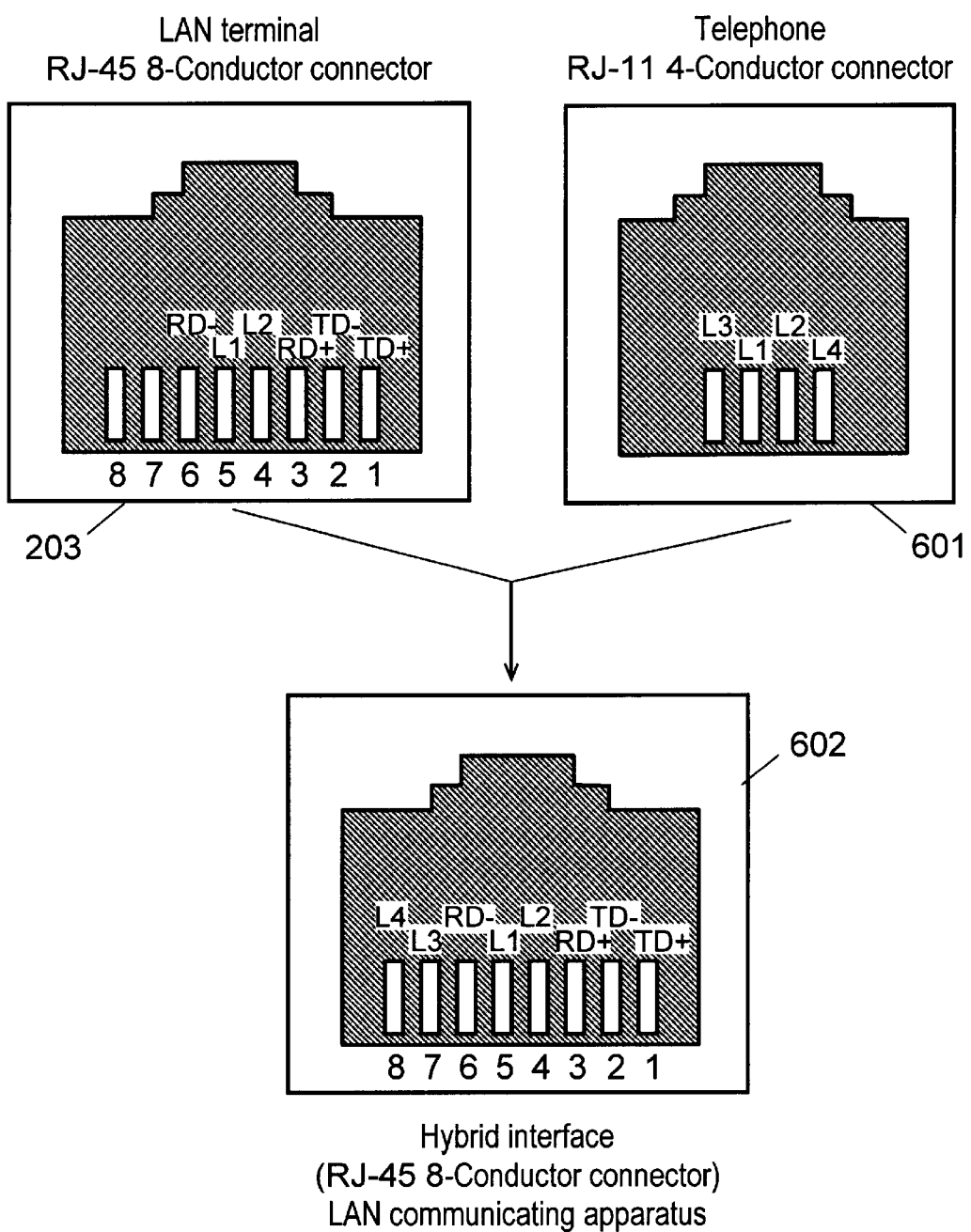
FIG. 8 illustrates pin-assignments of a hybrid interface connector on the LAN communication apparatus side, a LAN terminal connector, and a four-wired digital telephone in accordance with a fifth exemplary embodiment.
Figure 10:
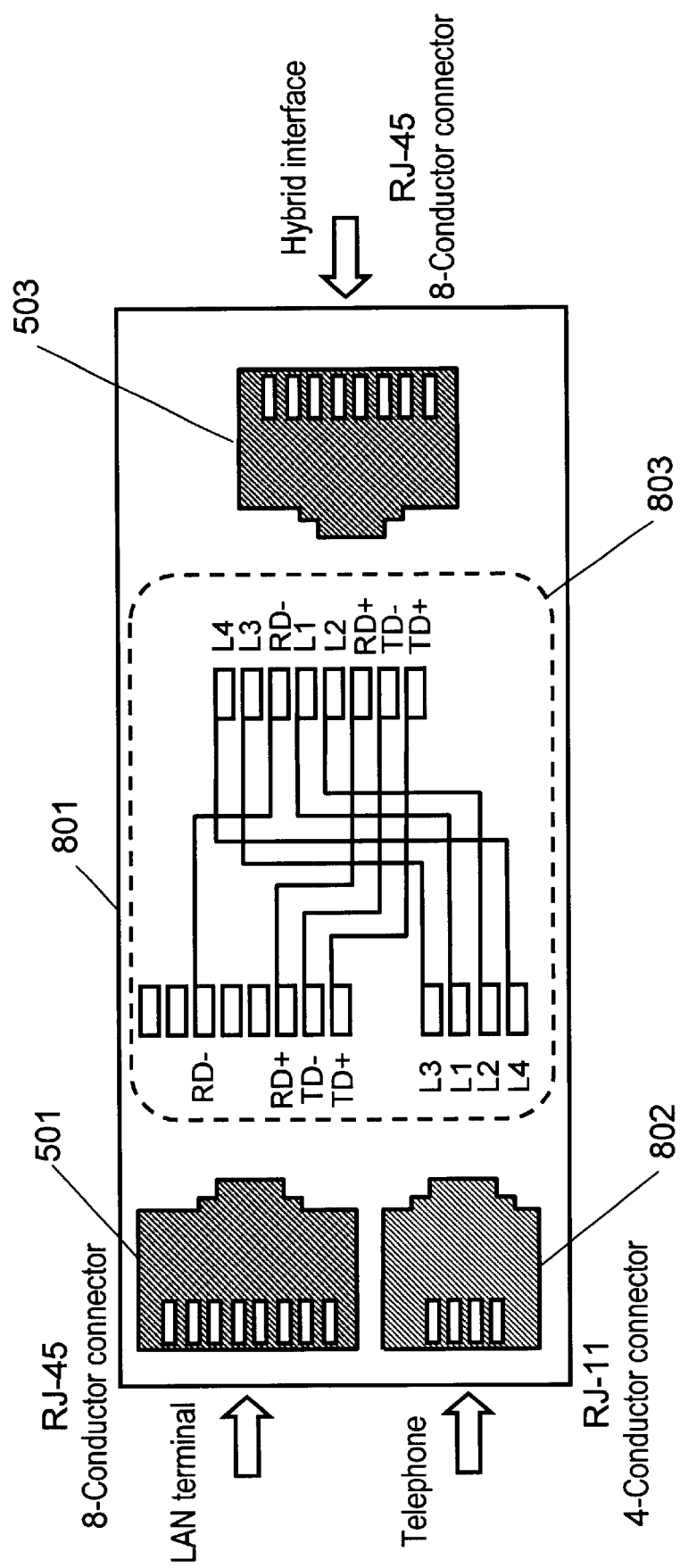
FIG. 10 illustrates wiring of distribution connector in accordance with the fifth embodiment.
Figure 11:
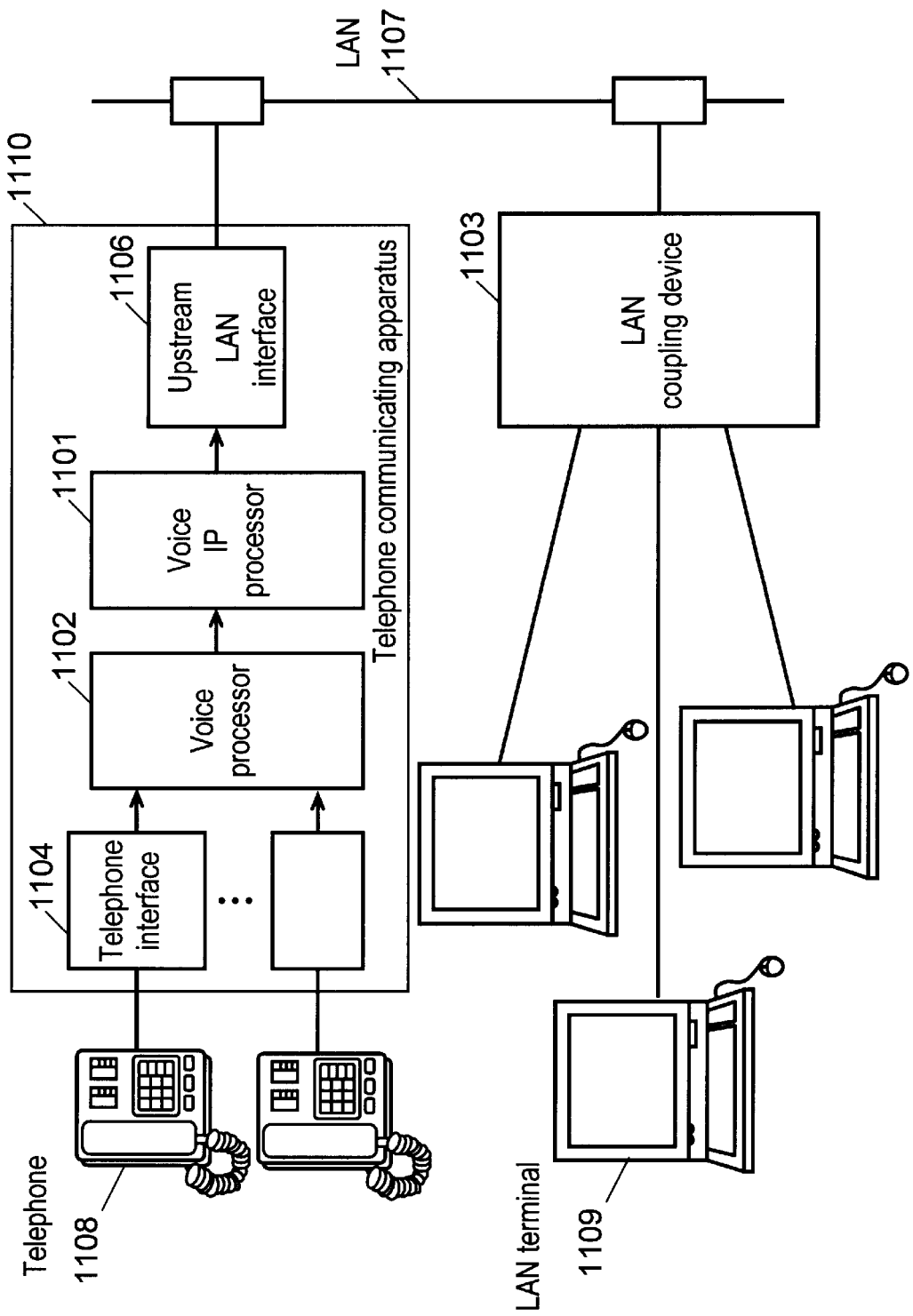
FIG. 11 is a block diagram illustrating a structure of a conventional LAN communicating apparatus.

FIG. 8 through FIG. 10 illustrate how a distribution connector—common to four-wire digital telephone and a two-wire analog telephone—hooks up those telephones and a hybrid interface.

FIG. 8 illustrates pin-assignment of a connector of the hybrid interface for hooking up the four-wire digital telephone. In this embodiment, four pins (L1, L2, L3 and L4) are used for the four-wire digital telephone as shown in a pin-assignment 601 of the telephone, while two-wire analog telephone uses two pins. Thus the pins Nos. 7 and 8, which have not been used yet, of the hybrid interface 413 (shown in FIG. 4) for the two-wire analog telephone are assigned exclusively to pins L3 and L4 for the four-wire digital telephone. As a result, the hybrid interface can hook up the four-wire digital telephone.

The two-wire analog telephone can be connected to a hybrid interface connector 602; however, the four-wire digital telephone cannot be directly connected to the interface connector 602 because pins L3 and L4 on the telephone side interfere with pins RD−, RD+ on the 10 BASE-T side. In a case of direct connection of the four-wire digital phone to the interface connector 602, a converting connector is required for converting the pin-arrangement of the RJ-11 type four-conductor connector into the pin-arrangement of the interface connector 602.

FIG. 9 illustrates an example of this case, i.e. the apparatus side pin-assignment of the hybrid interface common to the two-wire analog phone and the four-wire digital phone. FIG. 10 illustrates a distribution connector 801 which simultaneously hooks up the telephone (four-wired digital phone or two-wired analog phone) and the 10 BASE-T terminal. A RJ-11 type four-conductor connector 802 is used for connecting the telephone. A RJ-45 type eight-conductor connector 501 for the LAN terminal, the four-conductor connector 802 and the eight-conductor connector 503 for the hybrid interface are wired as shown in a space encircled with broken line 803. As FIG. 9 and FIG. 10 illustrate, the telephone (four-wired digital phone or two-wired analog phone) and the 10 BASE-T terminal can be simultaneously operated.

In the embodiments previously discussed, the pin-assignment is just an example; the pin-assignment is not limited to this example.

In the descriptions of embodiments 3, 4 and 5, the hybrid interface (with the RJ-45 type eight-conductor connector) is provided for hooking up the 10 BASE-T terminal 309 or the telephone 308 in the LAN communicating apparatus. However, the present invention is applicable to various types of LAN communicating apparatuses connectable to LANs. For instance, the same hybrid interface can be provided to a Private Branch Exchange (PBX) having a LAN interface and a telephone interface, and the same advantage is obtainable. Non-used pins of a RJ-45 type eight-conductor connector mounted to the PBX are assigned to a telephone, and either a 10 BASE-T terminal or the telephone can be hooked up to the connector. This preparation reduces respective wires for the terminal and the telephone, and reduces cost for wiring. Since the connector is unified for the terminal and the telephone, the easier operation and maintenance can be expected.

What is claimed is:

1. A local area network ("LAN") communicating apparatus connecting a telephone and a LAN terminal, said apparatus comprising:

(a) a telephone interface for coupling to the telephone;

(b) a downstream LAN interface for coupling to the LAN terminal;

(c) an upstream LAN interface for coupling to an upstream LAN;

(d) a voice processor providing a voice stream from said telephone interface with at least one of an echo-cancellation process, coding process and exchanging process;

(e) a voice internet protocol ("IP") processor for packetizing a voice stream from said voice processor; and (f) a bridge section for;

receiving voice frames from said voice IP processor;

receiving data frames from said downstream LAN interface;

receiving a volume of traffic which includes data frames from another LAN communicating apparatus, via said upstream LAN interface;

(g) a traffic controller which monitors said volume of traffic and which signals said another LAN communicating apparatus to regulate sending of said data frames in order to adjust said volume.

2. A local area network ("LAN") communicating apparatus coupling together a telephone and a LAN terminal, said apparatus comprising:

(a) a telephone interface for coupling to the telephone;

(b) a downstream LAN interface for coupling to the LAN terminal and providing first media access control ("MAC") frames;

(c) an upstream LAN interface for coupling to an upstream LAN;

(d) a voice processor providing a voice stream from said telephone interface with at least one of an echo-cancellation process, a coding process and an exchanging process;

(e) a voice IP processor packetizing a voice stream following an internet protocol to provide second MAC frames, the voice stream supplied from said voice processor; and (f) a MAC bridge section for:
  receiving the first MAC frames from said voice IP processor,
  receiving the second MAC frames from said downstream LAN interface,
  receiving a volume of traffic which includes data-MAC frames from another LAN communicating apparatus via said upstream LAN interface; and (g) a traffic controller which monitors said volume of traffic and which signals said another LAN communicating apparatus to regulate sending of said data-MAC frames in order to adjust said volume.

\* \* \* \* \*